United States Patent
Mielich et al.

(10) Patent No.: US 7,693,271 B2
(45) Date of Patent: Apr. 6, 2010

(54) METHOD AND APPARATUS FOR HANDLING AN INCOMING CALL TO AVOID A CONFLICT WITH AN EARLIER CALL

(75) Inventors: Rainer Mielich, Keltern (DE); Rolf Burkhardt, Helmsheim (DE); Vladimir Startsev, Stuttgart (DE)

(73) Assignee: Dialogic Corporation, Montreal, Quebec (CA)

( * ) Notice: Subject to any disclaimer, the term of this patent is extended or adjusted under 35 U.S.C. 154(b) by 1528 days.

(21) Appl. No.: 10/998,169

(22) Filed: Nov. 29, 2004

(65) Prior Publication Data

US 2006/0115064 A1    Jun. 1, 2006

(51) Int. Cl.
*H04M 3/42* (2006.01)

(52) U.S. Cl. ............... 379/201.01; 370/352; 379/88.18; 379/212.01; 379/230; 379/265.01; 455/415; 455/417; 703/6; 704/275

(58) Field of Classification Search ............ 379/201.01, 379/215.01, 207.15, 88.18, 212.01, 265.01, 379/230; 370/352; 455/415, 417; 703/6; 704/275

See application file for complete search history.

(56) References Cited

U.S. PATENT DOCUMENTS

| | | | | |
|---|---|---|---|---|
| 5,299,260 A * | 3/1994 | Shaio | ...... | 379/266.07 |
| 5,586,179 A * | 12/1996 | Stent et al. | ...... | 379/265.11 |
| 5,742,675 A * | 4/1998 | Kilander et al. | ...... | 379/266.09 |
| 5,999,611 A | 12/1999 | Tatchell et al. | | |
| 6,198,812 B1 * | 3/2001 | Weber | ...... | 379/142.04 |
| 6,246,889 B1 | 6/2001 | Boltz et al. | | |
| 6,289,084 B1 * | 9/2001 | Bushnell | ...... | 379/67.1 |
| 6,404,764 B1 * | 6/2002 | Jones et al. | ...... | 370/352 |
| 6,418,200 B1 * | 7/2002 | Ciccolella et al. | ...... | 379/88.18 |
| 6,519,335 B1 * | 2/2003 | Bushnell | ...... | 379/215.01 |
| 6,654,615 B1 | 11/2003 | Chow et al. | | |
| 6,751,307 B2 * | 6/2004 | McAlinden | ...... | 379/201.02 |
| 6,795,542 B1 * | 9/2004 | St. Jean | ...... | 379/212.01 |
| 6,985,576 B1 * | 1/2006 | Huck | ...... | 379/265.09 |
| 7,103,553 B2 * | 9/2006 | Applebaum et al. | ...... | 704/275 |
| 7,110,521 B2 * | 9/2006 | Lambrigts et al. | ...... | 379/230 |
| 7,123,712 B1 * | 10/2006 | Strathmeyer et al. | ...... | 379/265.09 |
| 7,158,628 B2 * | 1/2007 | McConnell et al. | ...... | 379/265.02 |
| 7,209,735 B2 * | 4/2007 | Sato | ...... | 455/415 |
| 7,499,844 B2 * | 3/2009 | Whitman, Jr. | ...... | 703/6 |
| 2002/0073207 A1 * | 6/2002 | Widger et al. | ...... | 709/227 |
| 2003/0210775 A1 * | 11/2003 | Crockett et al. | ...... | 379/215.01 |
| 2004/0229600 A1 * | 11/2004 | Saez et al. | ...... | 455/417 |
| 2005/0100157 A1 * | 5/2005 | Gray et al. | ...... | 379/265.01 |
| 2007/0127687 A1 * | 6/2007 | Yoshizawa et al. | ...... | 379/265.01 |
| 2007/0201679 A1 * | 8/2007 | Baggenstoss et al. | .. | 379/265.06 |

FOREIGN PATENT DOCUMENTS

WO    WO0205527    1/2002
WO    WO02078309   10/2002

* cited by examiner

*Primary Examiner*—Gerald Gauthier
(74) *Attorney, Agent, or Firm*—Weingarten, Schurgin, Gagnebin & Lebovici LLP

(57) ABSTRACT

A method for handling an incoming call received at an inbound terminal via an analog line is described. The method comprises receiving the incoming call at the inbound terminal; storing caller ID data enabling identification of incoming call; comparing a stored existing caller ID with the stored current caller ID to determine if an earlier incoming call is being signaled to an application; if the earlier incoming call is being signaled, disconnecting the earlier incoming call; and presenting the incoming call to the application thereby reducing the risk of conflict between incoming calls.

5 Claims, 4 Drawing Sheets

METHOD AND APPARATUS FOR HANDLING AN INCOMING CALL TO AVOID A CONFLICT WITH AN EARLIER CALL

CROSS-REFERENCE TO RELATED APPLICATIONS

This is the first application filed for the present invention.

TECHNICAL FIELD

This invention relates to the field of telecommunications. More precisely, this invention pertains to the field of communication on analog lines.

BACKGROUND OF THE INVENTION

In the case of an incoming call on analog lines, no defined event exists for signaling the end of a call establishment phase. Such limitation may create various problems as explained below.

For instance, as shown in FIG. 1, there is shown a diagram which discloses how a conflict may occur due to the limitation.

In the case where a first incoming call is provided by an outbound switch to an Application Programming Interface (API) of an inbound terminal, a ring signal for the first incoming call is issued to an application at the inbound terminal. The skilled addressee will appreciate that the incoming call is provided using a ringing voltage on the line. The application may be any type of application such as for instance a voicemail managing application, an authentication application based on incoming call data, Unified Messaging Applications, Automatic Call Distribution (ACD) Server, Voice over IP (VoIP) Gateway, Point of Sales Server (POS), etc. In response to the ring for the first call, the application issues a "Call Accept Command" (i.e., an AT Answer (ATA) command if a port driver or a TTY driver is used as Application Programming Interface (API)) for instance.

If while the "Call Accept Command" is being issued to the API, the party issuing the first incoming call hangs up and therefore causes the first incoming call to be terminated and if a second incoming call issued by another party is being provided to the application, the "Call Accept Command" issued to the API will be applied against the second incoming call causing a conflict.

Such conflict may be the source of Denial of Service (DoS) attacks in the case for instance where an access to an application is based upon a calling or called identity. Incoming calls may also be directed to wrong directions by an application. In the case where the application is an answering machine, a user issuing a call may leave a message in a wrong voicemail.

There is a need for a method and apparatus that will overcome at least one of the above-identified drawbacks.

SUMMARY OF THE INVENTION

The invention provides a method and apparatus for handling an incoming call.

According to an aspect of the invention, there is provided a method for handling an incoming call received via an analog line, the method comprising receiving the incoming call, checking if an earlier incoming call is being signaled to an application, if the earlier incoming call is being signaled, disconnecting the earlier incoming call and presenting the incoming call.

According to another aspect of the invention, there is provided an apparatus for handling an incoming call signal received via an analog line. The apparatus comprises a communication port receiving the incoming call signal and providing a received call signal comprising incoming call information representative of the incoming call signal; a memory unit; and a processing unit receiving the received call signal and accessing the memory unit using the incoming call information to find out if the memory unit comprises another incoming call information signal representative of an earlier incoming call signal being signaled. The processing unit further provides a signaling signal if the memory unit does not comprise another incoming call information signal.

According to yet another aspect of the invention, there is provided a method for handling an incoming call received at an inbound terminal via an analog line. The method comprises receiving the incoming call at the inbound terminal; storing caller ID data enabling identification of incoming call; comparing a stored existing caller ID with the stored current caller ID to determine if an earlier incoming call is being signaled to an application; if the earlier incoming call is being signaled, disconnecting the earlier incoming call; and presenting the incoming call to the application.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
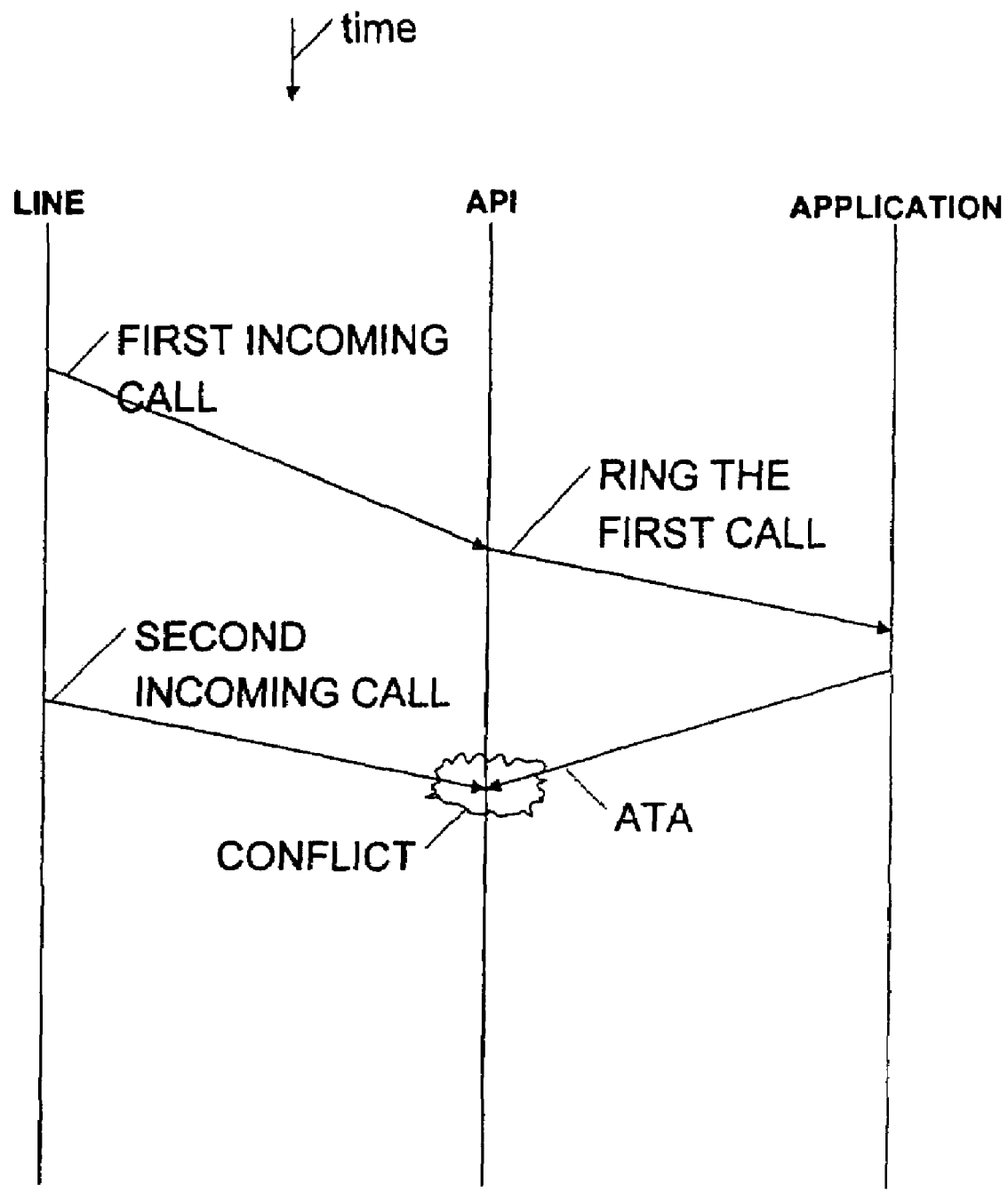
FIG. 1. is a diagram showing a case where a conflict occurs due to existing limitations; an answer command is issued by an application of an inbound terminal for a wrong incoming call.
Figure 2:
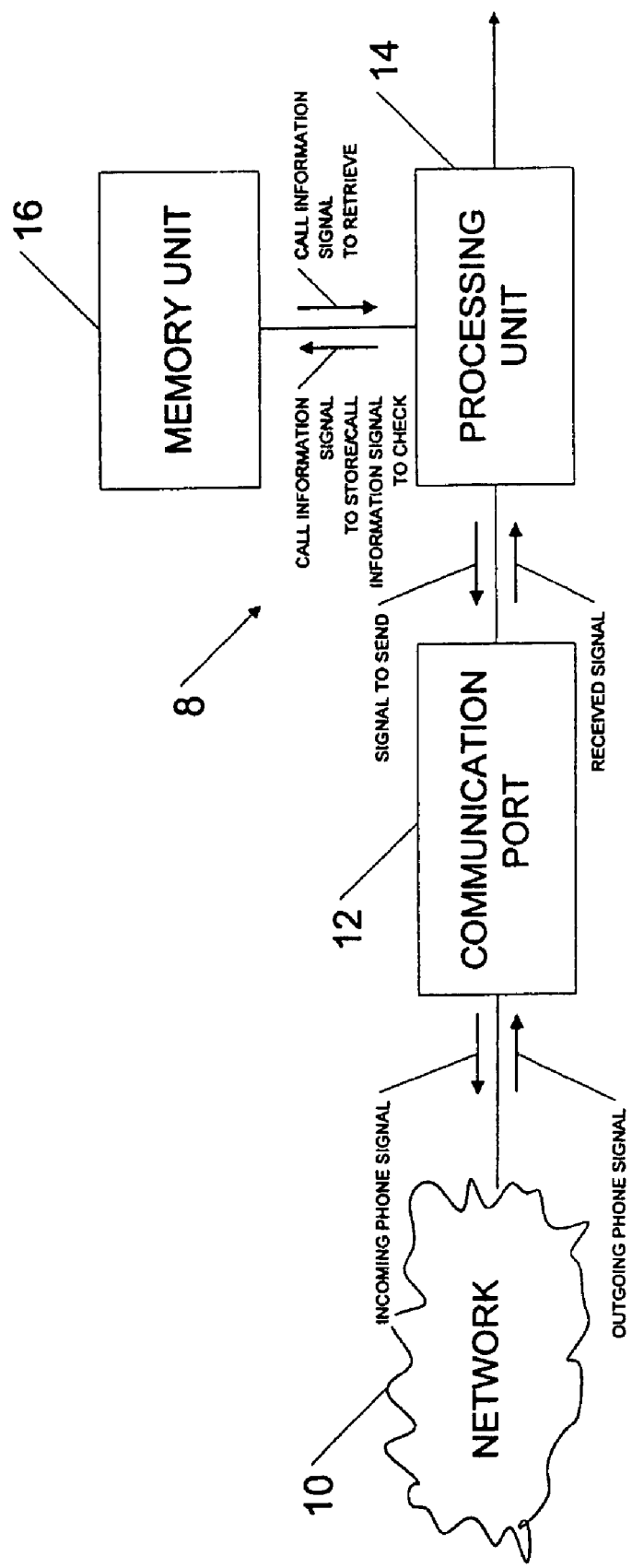
FIG. 2 is a block diagram showing an apparatus for handling an incoming call according to an embodiment of the invention.

Now referring to FIG. 2, there is shown a block diagram showing an apparatus 8 for handling an incoming call at an inbound terminal according to an embodiment of the invention.

The apparatus 8 comprises a communication port 12, a processing unit 14 and a memory unit 16.

The communication port 12 is adapted for receiving an incoming call signal originating from an outbound switch, not shown, located on a network 10 and further for providing a received signal to the processing unit 14.

The communication port 12 is further adapted for receiving a signal to send and providing an outgoing phone signal to the network 10.

In an embodiment, the communication port 12 comprises a Direct Access Arrangement (DAA) chip as analog front end (AFE) to terminate the network 10.

The processing unit 14 is adapted for receiving the received signal provided by the communication port 12 and further adapted for providing a signal to send to the communication port 12. The processing unit 14 is further adapted for storing a call information signal in the memory unit 16 and further for retrieving the call information signal from the memory unit 16.

It should be understood by the skilled addressee that in one embodiment, the communication port 12, the processing unit 14 and the memory unit 16 are embedded into a single card referred to as an "active" embedded system card. Such card may be then plugged to a computer for instance. In another embodiment, the processing unit of a computer as well as at least one part of the memory unit of the computer are used which is referred to as a "passive" design.

The memory unit 16 is adapted for storing a call information signal. It should be appreciated that the call information signal may be any type of data enabling the identification of a call such as for instance caller ID data. It should be further appreciated that the memory unit 16 may be used to store additional information provided in the case where an SMDI (Simplified Message Desk Interface) interface is used. Such additional information may comprise additional call related information like Redirecting Number or receive/send Message Waiting signal. As known by the skilled addressee, using SMDI requires an extra serial cable connected to some specific switch types. In fact, as known by the skilled addressee, with most networks the caller ID information may be provided using in-band tones (e.g. like FSK modem tones or DTMF tones) after or before the first ring. As explained previously, the memory unit 16 may be a dedicated memory unit comprised in an embedded system card while alternatively, the memory unit of a computer may be used.

It should be understood that the communication port 12, the processing unit 14 and the memory unit 16 may be implemented in an existing communication device such as a modem for instance.

Figure 3:
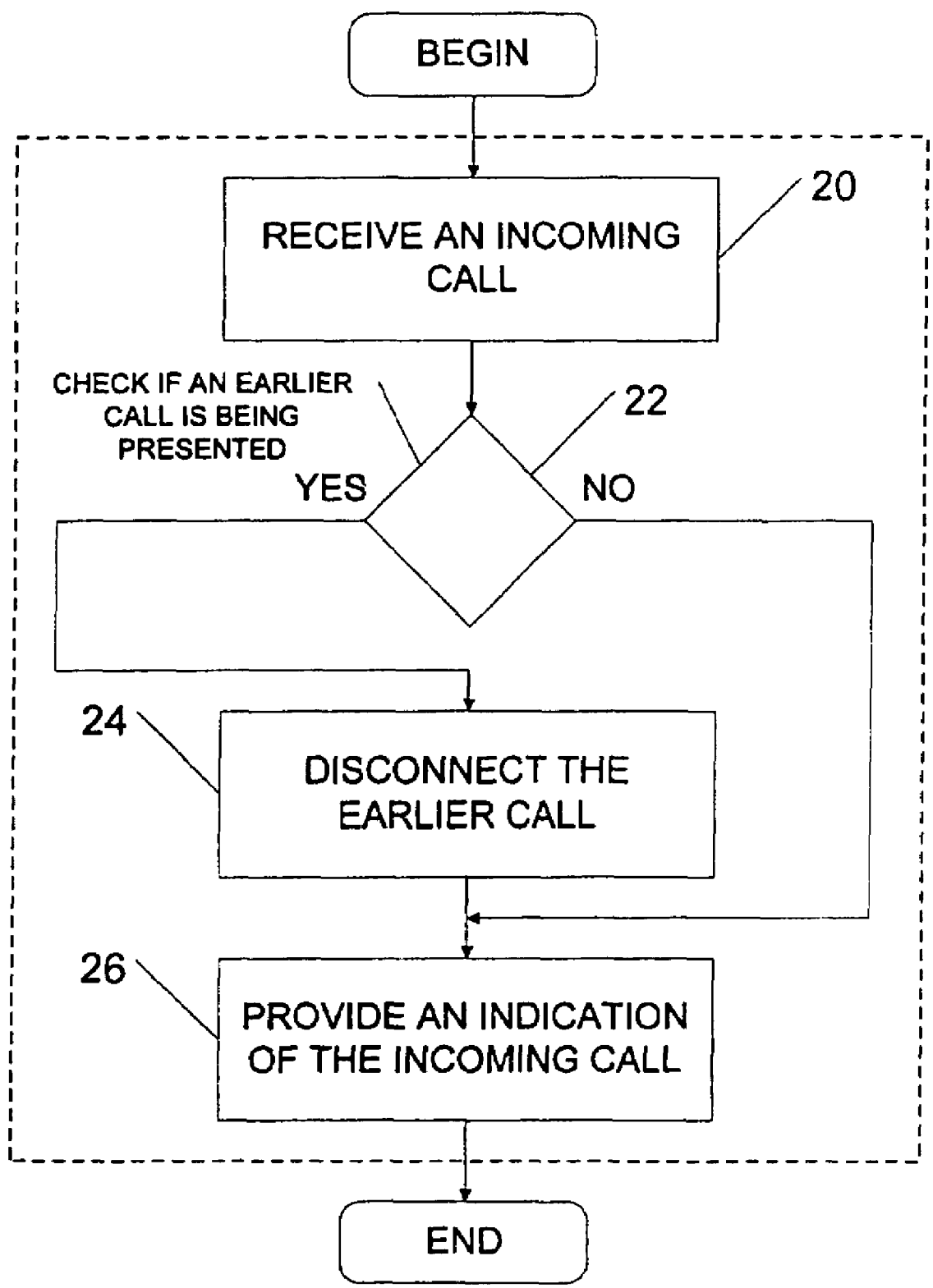
FIG. 3 is a flowchart showing how an incoming call is handled according to one embodiment of the invention.

Now referring to FIG. 3, there is shown how an incoming call is handled according to one embodiment of the invention.

According to step 20, an incoming call is received. The incoming call is received from the network 10 by the processing unit 14 via the communication port 12. Alternatively, at least one part of the incoming call, the incoming call information, may be received from an external serial interface (e.g. a SMDI interface), while the call comes in at the communication port 12.

According to step 22, a check is performed using the received incoming call in order to find out if an earlier incoming call is being signaled. The check is performed by the processing unit 14 disclosed in FIG. 2. More precisely, the processing unit 14 checks in the memory unit 16 if the latter comprises an existing call information signal indicative of an earlier incoming call. It should be appreciated that preferably, the memory unit 16 comprises an existing call information signal if an earlier incoming call is being signaled. Still in the preferred embodiment, the check is performed by comparing a stored existing call information signal, if any, with the current call information signal.

In the case where an earlier incoming call is being signaled, i.e., in the case where the current call information signal is different from the earlier incoming call information signal, the earlier call is disconnected. Preferably, the earlier call is disconnected using the processing unit 14.

In the case where no earlier incoming call is being signaled and according to step 26, an indication of the incoming call is provided. In the preferred embodiment, the indication of the incoming call is stored in the memory unit 16 by the processing unit 14. The incoming call is then presented to the application.

Figure 4:
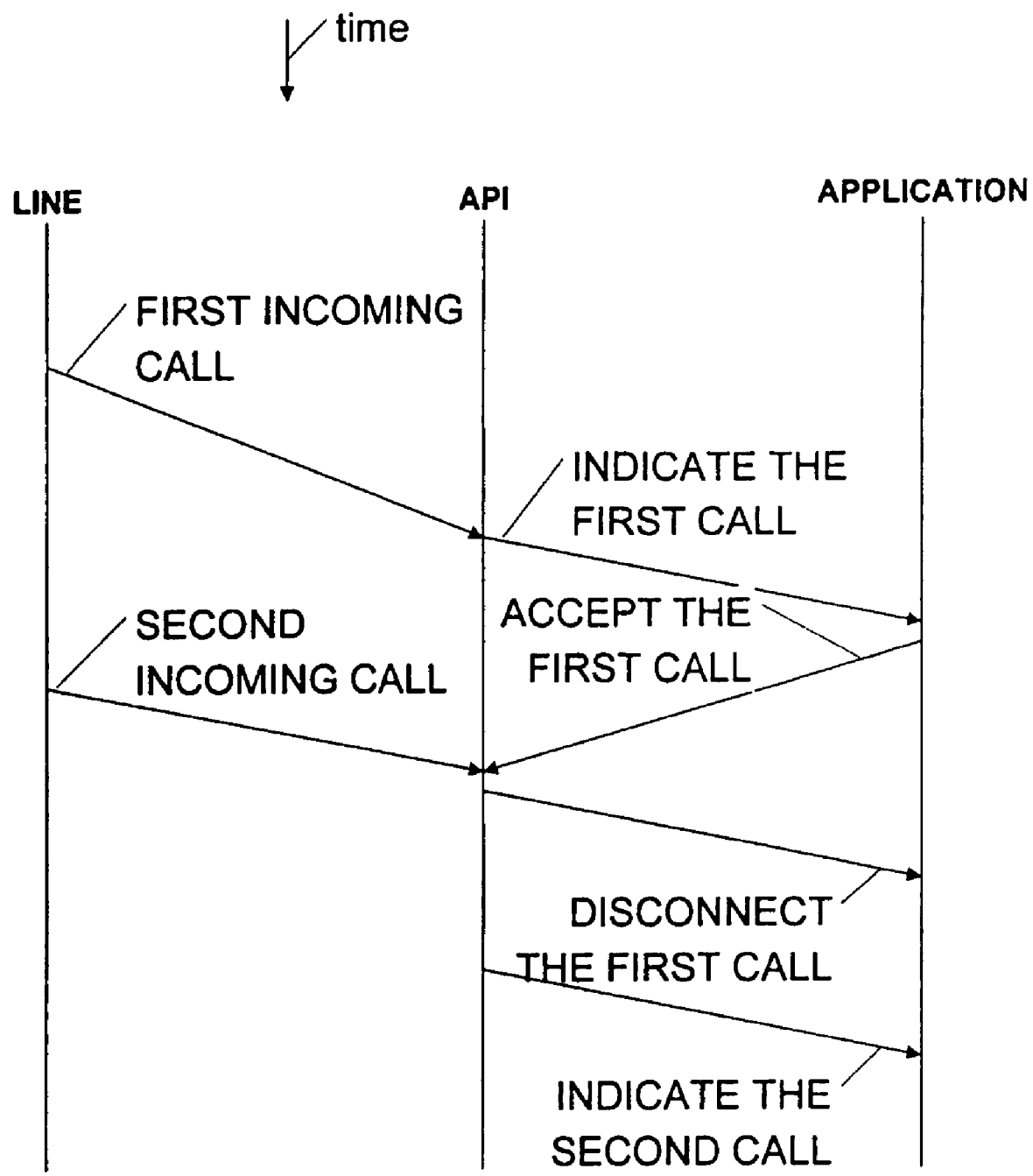
FIG. 4 is a diagram showing how the handling of an incoming call according to the invention overcomes the above-identified limitation.

Now referring to FIG. 4, there is shown how the handling of an incoming call according to the invention overcomes the above-identified limitation.

More precisely, a first incoming call is provided to an Application Programming Interface (API), the first incoming call is signaled to an application.

The first incoming call is accepted by the application and a command to that effect is issued by the application and is directed to the API.

A second incoming call is issued prior to the command to the effect that the first incoming call is accepted is received by the API.

A check is performed by the API as disclosed at step 22 of FIG. 3 and it is therefore detected that the first incoming call is being signaled.

A notice to the effect that the first call is disconnected is then sent to the application and a notice indicating that the second incoming call is presented to the application.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetic signal.

The embodiments of the invention described above are intended to be exemplary only. The scope of the invention is therefore intended to be limited solely by the scope of the appended claims.

We claim:

1. A method for handling an incoming call received at an inbound terminal via an analog line, said method comprising:
   receiving said incoming call at said inbound terminal;
   checking at said inbound terminal if any earlier incoming call is being signaled to an application, wherein said checking comprises accessing a memory unit comprising incoming call information;
   if it is determined at said inbound terminal that said earlier incoming call is being signaled to the application, disconnecting said earlier incoming call; and
   presenting said incoming call, wherein said presenting of said incoming call comprises storing corresponding incoming call information in said memory unit.

2. An apparatus for handling an incoming call signal received via an analog line, said apparatus comprising:
   a communication port receiving said incoming call signal and providing a received call signal comprising incoming call information representative of said incoming call signal;
   a memory unit; and
   a processing unit receiving said received call signal and accessing said memory unit using said incoming call information to find out if said memory unit comprises another incoming call information signal representative of an earlier incoming call signal being signaled, said processing unit further providing a signaling signal to the communication port to disconnect said earlier incoming call signal if said memory unit comprises the another incoming call information signal.

3. The apparatus as claimed in claim 2, wherein said signaling signal is provided to an application.

4. The apparatus as claimed in claim 3, wherein said application is selected from a group consisting of voicemail applications, incoming call-based authentication applications, unified messaging applications, automatic call distribution (ACD) servers, Voice over IP (VoIP) gateways, Point of Sales, (POS) Servers.

5. A method for handling an incoming call received at an inbound terminal via an analog line, said method comprising:

receiving said incoming call at said inbound terminal;

storing a current caller ID enabling identification of said incoming call;

comparing a stored existing caller ID enabling identification of an earlier incoming call with the stored current caller ID to determine if said earlier incoming call is being signaled to an application;

if said earlier incoming call is being signaled, disconnecting said earlier incoming call; and presenting said incoming call to said application.

\* \* \* \* \*